R. L. DEZENDORF.
MEANS FOR TESTING GAS METERS.
APPLICATION FILED JULY 21, 1916.
1,306,658.
Patented June 10, 1919.
3 SHEETS—SHEET 2.
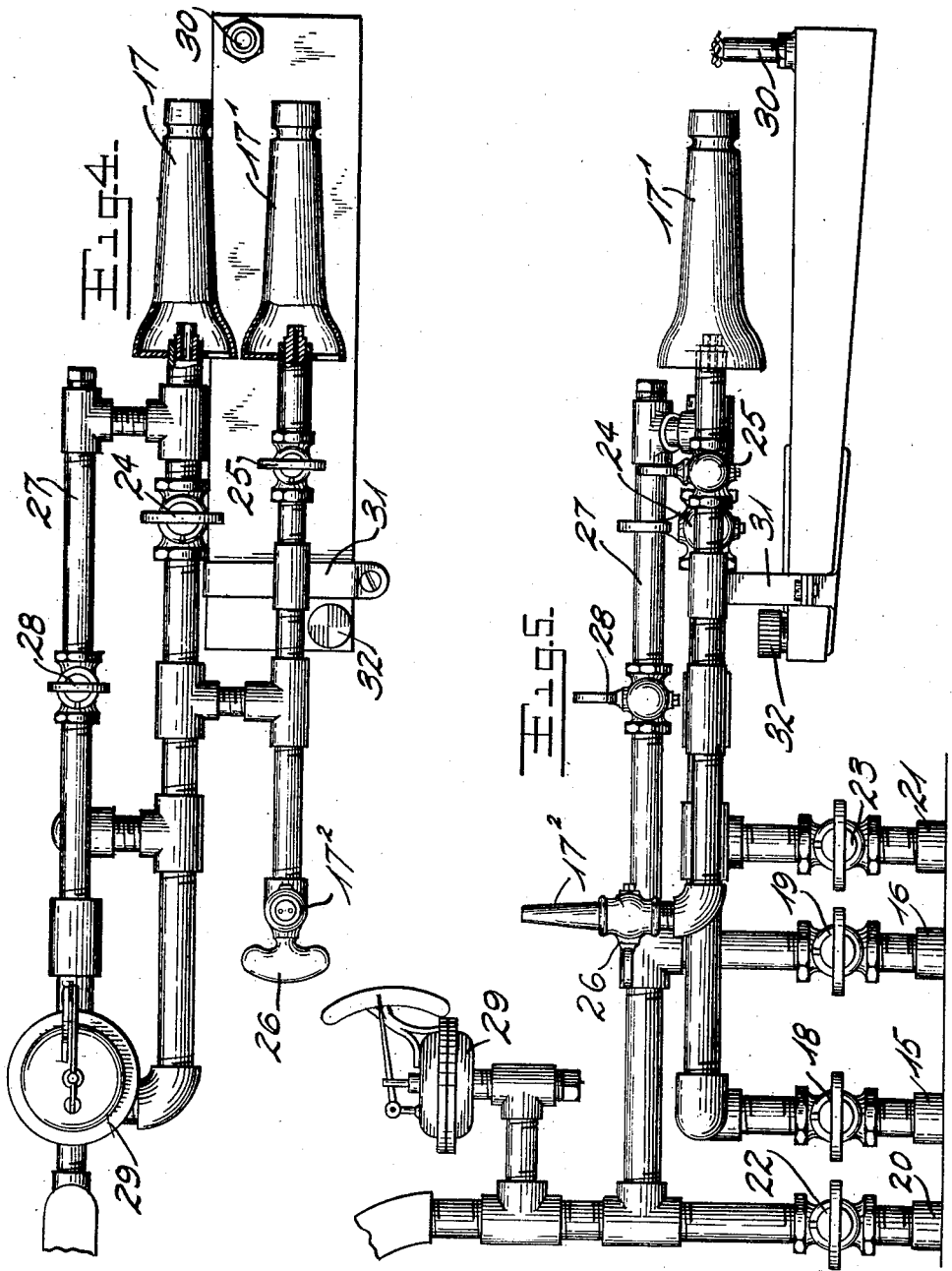
Inventor
R. L. Dezendorf
By his Attorneys
Bartlett & Brownell

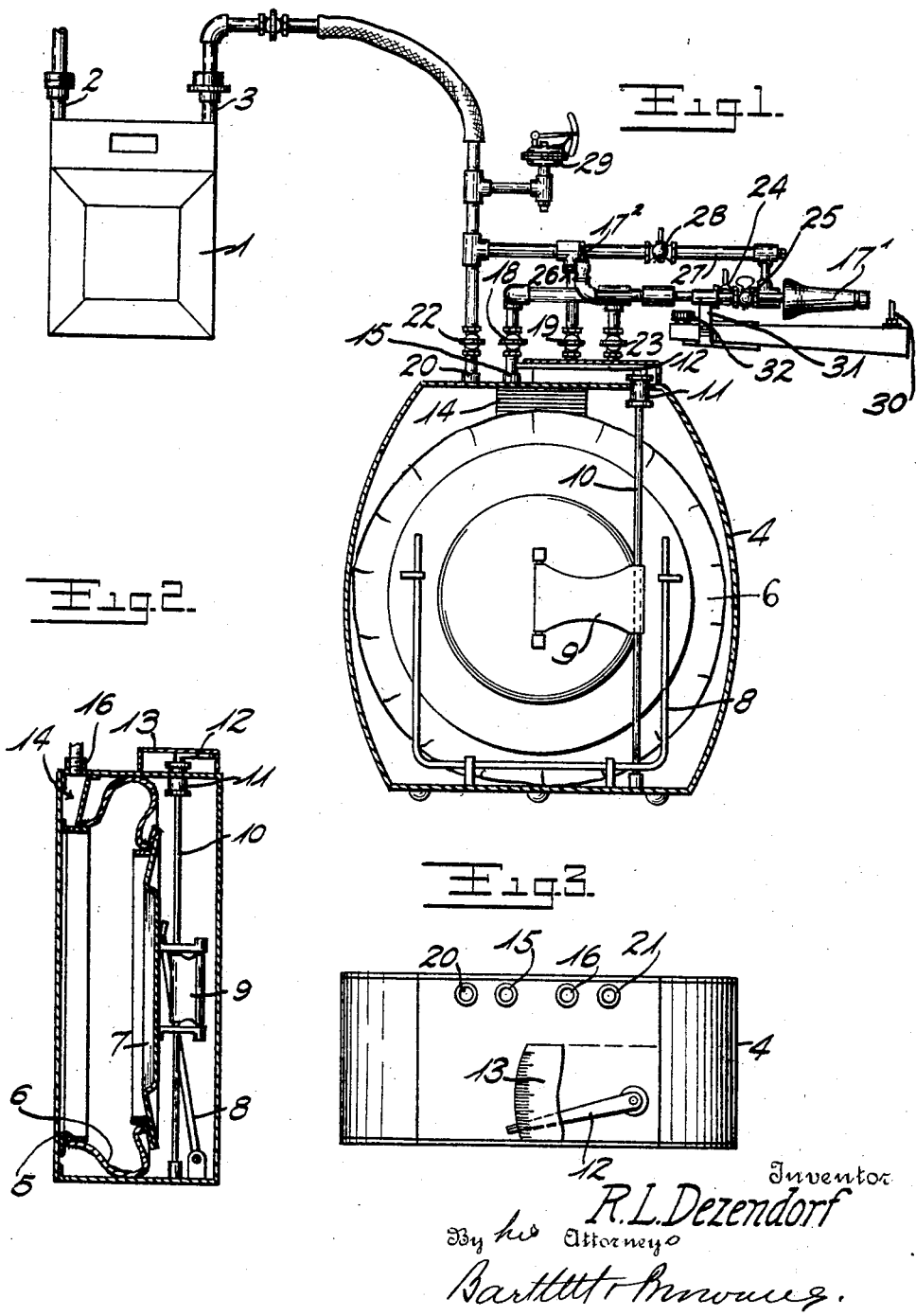

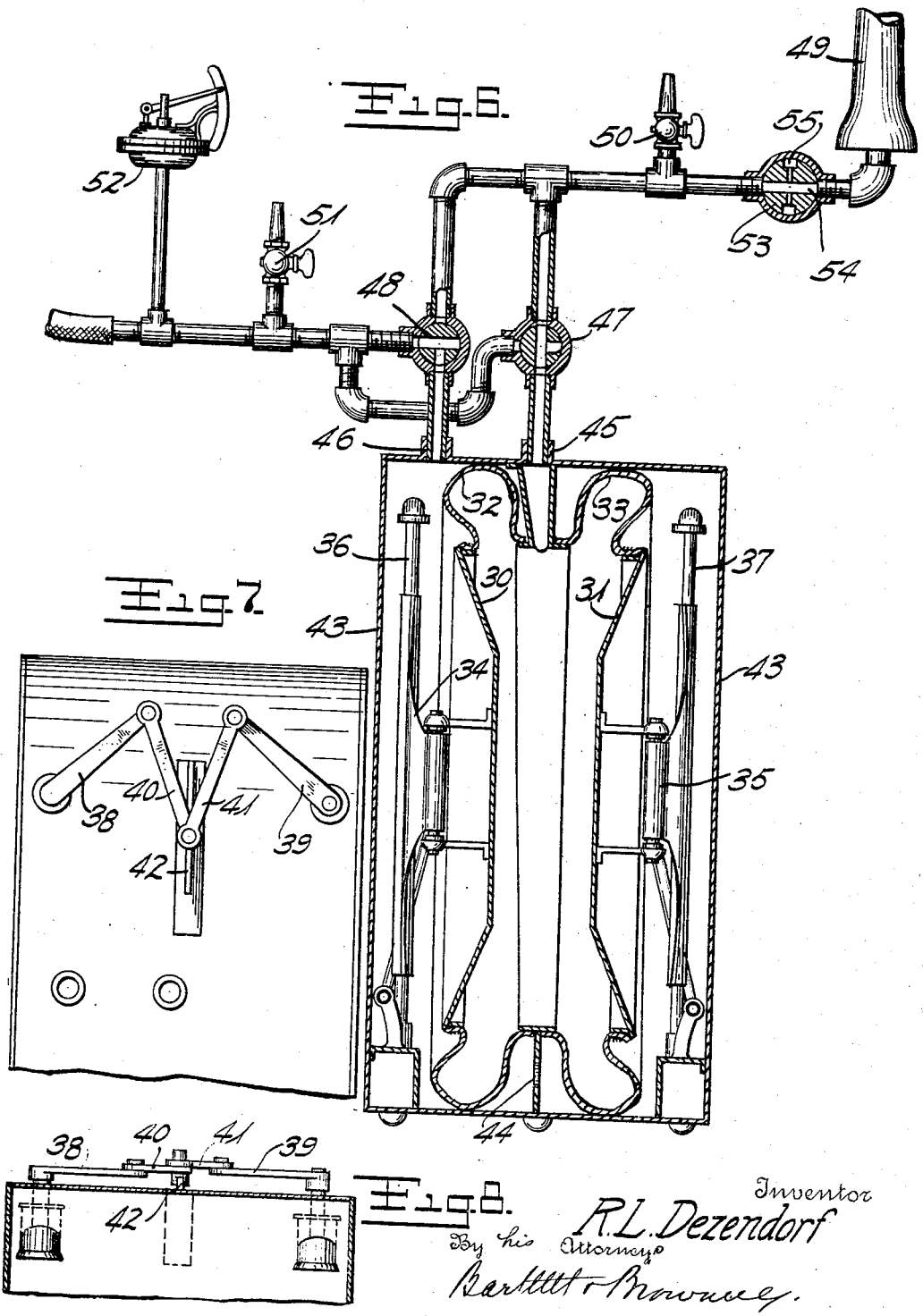

UNITED STATES PATENT OFFICE.

RICHARD L. DEZENDORF, OF RICHMOND HILL, NEW YORK.

MEANS FOR TESTING GAS-METERS.

1,306,658.  Specification of Letters Patent.  Patented June 10, 1919.

Application filed July 21, 1916. Serial No. 110,458.

*To all whom it may concern:*

Be it known that I, RICHARD L. DEZENDORF, a citizen of the United States, residing at Richmond Hill, county of Queens, State of New York, have invented certain new and useful Improvements in Means for Testing Gas-Meters, of which the following is a full, clear, and exact description.

My invention relates to means for testing gas meters *in situ* and has for its object to provide an easily portable apparatus for that purpose. It further has for its object to provide means for setting the indicator of the meter to be tested. It also has for its object means for providing a plurality of rates of discharge for the testing apparatus. It further has for its object a means to insure the ignition of the gas from the main testing burners whenever it escapes therefrom. It further has for its object to provide a test meter in which the sources of error are eliminated.

The following is a description of an embodiment of my invention, reference being had to the accompanying drawings, in which:

Figure 1 shows a side elevation of the meter to be tested and the testing apparatus, the test meter casing being shown in section.

Fig. 2 shows a transverse section of the test meter casing and contents.

Fig. 3 shows a plan view of the test meter casing with the indicator.

Fig. 4 shows a plan view of the piping and burners to be connected to the gas meter and test meter.

Fig. 5 shows a side elevation of the same.

Fig. 6 shows a modification with the test meter in section.

Fig. 7 shows a plan view of the test meter and indicator.

Fig. 8 is a detail of the indicator.

Referring more particularly to the drawings, 1 is a meter to be tested *in situ* having an inlet 2 and discharge 3. 4 is a test meter having a casing, to one wall of which is secured a flange 5, to which one end of a sheepskin bellows 6 is fastened. To the outer end of the bellows 6 is connected a moving disk 7, steadied by the pivoted bail 8 and having pivoted thereto a flag 9 which is rigidly connected to the flag wire 10. The flag wire 10 extends through a suitable stuffing box 11 at the top of the test meter casing and has rigidly connected thereto an arm 12 which moves beneath a casing 13. The upper side thereof, adjacent to the free end of said arm, is graduated so as to form a scale, as shown in Fig. 3. The upper end of the meter is provided with a chute 14 which opens in the chamber formed by the bellows 6 and disk 7. The bellows and disk constitute a flexible wall dividing the interior of the casing into two separate chambers. Into the chute 14 opens two ports 15 and 16, the former of which, 15, is connected to a discharge device having discharge burners 17, 17' and 17². The port 16 is connected by suitable piping to the discharge 3 of the meter to be tested. Adjacent to the ports 15 and 16 are cocks 18 and 19 for controlling the same. The chamber surrounding the bellows 6 is provided with two ports 20 and 21 from which extend pipes having cocks 22 and 23. The port 20 is connected by suitable piping directly with the discharge 3 of the meter to be tested while the port 21 is connected by suitable piping to the discharge device having the burners 17, 17' and 17². The burners 17, 17' and 17² are adapted to be controlled so far as they receive gas from the test meter 4 by the stop cocks 24, 25 and 26 respectively. The burner 17 and the burner 17' are of the blue flame type, *i. e.*, Bunsen burners. Burner 17 is considerably larger than the burner 17' which furnishes a relatively small load of definite amount. The burner 17² is an ordinary illuminating burner consuming but a small amount of gas and is used in part of the testing operation and also for illumination. It is of much smaller capacity than the burners 17 and 17'. Connected to the pipe supplying the burner 17 at a point beyond the cock 24 is a pipe 27 which leads from the pipe which is connected to the meter discharge and is connected thereto at a point above the stop cock 22. This pipe 27 is connected with a stop cock 28. Connected directly with the pipe leading from the meter discharge is a pressure gage or indicator 29 preferably of the dry type. In proximity to the discharge of the burner 17 and 17' is a burner 30 of a spirit lamp supported by a bracket 31 and having a filling plug 32. The burner 30 is so located that any gas discharging from the burner 17 or 17' would be at once ignited, thus constituting a pilot light, it being important to insure immediate ignition so as to prevent the escape of unburned gas.

In operating my apparatus as above described so as to test a meter *in situ*, I first connect it to the discharge of the meter to be tested, and I then light the spirit lamp at the burner 30. Assuming that the pointer 12 is in an intermediate position and nearer the rear end of its scale, I then open the cock 25 and the cocks 18 and 22, the cocks 19 and 23 being closed, so that the gas flows into the test meter until the hand 12 of the test meter moves to its rear initial position at the end of its scale. I then close the cock 25 and the cocks 18 and 22. I then open the cock 28 permitting the meter to be tested to run until its first hand reaches one of the divisions on the dial thereof. I then close the cock 28. The apparatus is now in condition for the beginning of the actual test.

In conducting the actual test I first open the cocks 19, 23 and 24 and one of the cocks 25 and 26, or all of these cocks, lighting the gas escaping from the burner $17^2$ and permit the apparatus to run until the indicator pointer 12 has completed about three-fourths of its traverse in one direction. I then, if the meter to be tested is a small meter, close off all the burners except the burner $17^2$, watching the hand 12 on the test meter closely and as soon as that has fully completed its first traverse I close the cock 26 to burner $17^2$. I close the cocks 23 and 19. I then open the cocks 18 and 22, then open the cock 24, and if greater speed is desired the cocks 25 and 26, lighting the gas at the burner $17^2$, and permit the apparatus to run until the hand 12 upon the test meter has completed three-fourths of its traverse in the opposite direction. I then close the cocks 24 and 25 and let the apparatus run with the cock 26 only open until the hand on the test meter has completed its second traverse, whereupon I close the cock 26 and cocks 18 and 22. The test meter shown has a definite capacity, such that when the hand 12 thereon has completed one traverse the amount of gas that has then passed into the test meter will be one foot, so that for a double traverse of the indicating hand upon the test meter the amount of gas that has been passed through the meter to be tested will amount to two feet. Ordinary service meters have their first or test dials calibrated so as to register every two feet, so that when a test as above described has been completed observation of the first meter hand and the hand 12 upon the test meter will show whether the meter to be tested has been running fast or slow. If the test meter indicator shows that two feet have passed and the indicator upon the meter to be tested shows that less than two feet has been registered it discloses the fact that the meter to be tested is running slow and vice versa.

As stated above, the burner $17^2$ performs two functions, one a testing function and the other that of illumination. The burner 30 insures the immediate ignition of any gas which may escape from the burners 17 and 17'. The use of blue flame burners prevents the formation of any soot which would otherwise be formed. The pressure gage 29 enables the operator to ascertain whether the pressure is normal although the operation of the testing apparatus does not depend upon the pressure and may be used to determine whether the connections are gas tight. The reason for having ports 17, 17' and $17^2$ of different sizes is so as to be able to control the rate of discharge during a test. By using the large ports the time for the test is very materially reduced. By using a small port at the time that the indicator 12 upon the test meter is reaching either end of its traverse enables the test meter to be stopped at the moment that the end of the traverse is reached. Furthermore, in making a test errors are apparent upon a small load, which would not be noticeable if the test were made with a large load only since the defects in a meter to be tested are more evident during a time when the load thereon is small than during a time when the load thereon is great. It is not, however, necessary to make the entire test of the meter to be tested upon the small load and the use of a large load helps the test very greatly by reducing the time required without seriously interfering with the accuracy of the result. The controlling means being manually operable result in making the apparatus one of great simplicity which is not liable to get out of order.

Fig. 6 shows a modification of my invention in which the parts are somewhat simplified. In this figure a test meter having two movable walls 30 and 31 is employed, the same being composed of disks 30, 31 connected to bellows 32, 33. The disks 30, 31 and the diaphragms 32, 33 inclose a single chamber. The disks 30, 31 are connected to flags 34, 35, which are connected to flag wires 36, 37. The flag rods pass through stuffing boxes and terminate in arms 38, 39. To these arms 38 and 39 the lower flag arms 40, 41 are connected, their ends being connected to an index 42 sliding on a scale 43. This scale has graduating marks so that the position of the index member 42 can be observed and read. The outer casing of the gas meter 43 forms a second chamber surrounding movable walls composed of the disks 30 and 31 and their bellows, there being a free opening 44 in the support for the inner ends of the bellows.

The meter casing is provided with a port 45 which connects with a chamber between the disks 30 and 31 and also with a port 46 which connects with the chamber outside the disks 30 and 31. These ports 45 and 46 lead to three-way cocks 47 and 48 from which pipes lead which extend to the ports 45 and 46 and also to a blue flame burner 49 and a smaller illuminating and testing burner 50. The third ports on these cocks are connected by suitable connections with the meter to be tested. Between these cocks and the meter to be tested is a burner 51 and a pressure indicator 52. In operating this apparatus to test a meter the cocks 47 and 48 are first turned into the positions shown and then the cocks 50 and 53 are opened so as to permit the gas to escape freely from the burners controlled thereby until the indicator of the test meter is near one of its original positions. The cock 53 is then closed and then when the traverse is completed the cock 50. The cock 51 is then opened so as to permit gas to escape from the burner until the indicating hand upon the small dial of the meter to be tested corresponds with one of the graduations thereon. The cock 51 is then closed. The cocks 47 and 48 are then reversed, so that gas flows into the inner chamber and away from the center chamber, and the cock 53, which controls the passage of the gas to the burner 49, is then placed in such position that its large port 54 permits gas to pass to the burner 49, the gas at the burner 49 being lighted by any suitable means. After the indicating device of the test meter has completed about three-quarters of one of its traverses the cock 53 is shifted so as to permit the small port 55 to discharge gas to the burner 49, or if a very small meter is to be tested the cock 53 may be so positioned as to cut off all flow of gas through the burner 49 and the cock 50 may be opened so as to permit a very small load to discharge through its burner. When the indicating device on the test meter has reached the end of one of its traverses the cocks 50 and 53 are so set as to cut off the flow of gas to their burners and the cocks 47 and 48 are so shifted that gas from the meter to be tested is discharged into the chamber outside the walls 30 and 31 and is discharged from the test meter through the port 45. The cock 53 is then adjusted so as to permit the gas to pass to the burner 49 through the large port 54 and the apparatus permitted to run until the indicating device upon the test meter has completed about three-fourths of its traverse when as before the cock 53 is shifted so as to permit gas to discharge from the burner 49 through the small port 55 or as before to shut off the gas, so that the run can be completed with the cock 50 opened so as to permit the gas to pass through its burner. When the traverse is completed the cocks 50 and 53 are again set so as to prevent the discharge of gas from the test meter. The test meter in this case also has a capacity of one foot for each traverse of the indicating device thereof so that the two traverses will correspond to the passage of two cubic feet of gas through the meter to be tested. If the meter to be tested indicates at the end of the test that two cubic feet of gas have passed it has registered correctly. If however, it indicates less than two cubic feet of gas it is running slow, or if it indicates more than two cubic feet of gas, it is running too fast. The operation, therefore, is quite similar to the other modification although requiring less manipulation. The fundamental principles of construction and operation, however, are the same.

The connections between the arms 38 and 39 not only result in producing a common indication but also coördinate the movements of the disks 30 and 31 so that they simultaneously begin and end their movements.

While I have described one way of manipulating my apparatus for a test, it is obvious that other ways may be employed. Care should be taken, however, that a considerable portion of the double traverse of the indicator 12 and 42 be made when a small load is passing through the meter to be tested.

As will be evident to those skilled in the art my invention permits of various modifications without departing from the spirit thereof or the scope of the appended claims.

What I claim is:

1. In a means for testing gas meters, the combination of a casing, flexible means dividing the interior of said casing into two separate chambers, so as to make it a double-chambered casing, an indicating device operated by said flexible means and having a to and fro movement, a discharge for gas from said chambers adapted to be connected to and disconnected from either chamber, a supply pipe leading from the meter to be tested and adapted to be connected to and disconnected from either chamber, so as to discharge all the gas from said meter into said two chambers one after the other and means for controlling the amount of gas passing through said discharge so as to vary it from a small load to a large load during a test.

2. In a means for testing gas meters, the combination of a casing, flexible means dividing the interior of said casing into two separate chambers, an indicating device operated by said flexible means, a discharge for gas from said chambers adapted to be connected to and disconnected from either chamber, a supply pipe leading from the meter to be tested and adapted to be connected to and disconnected from either chamber, and means for controlling the amount of gas passing through said discharge so as to vary it from a small load to a large load, and means for passing gas through the meter to be tested independently of said chambers.

3. In a means for testing gas meters, the combination of a casing, flexible means dividing the interior of said casing into two separate chambers, an indicating device operated by said flexible means, a discharge for gas from said chambers adapted to be connected to and disconnected from either chamber, a supply pipe leading from the meter to be tested and adapted to be connected to and disconnected from either chamber and means for controlling the amount of gas passing through said discharge so as to vary it from a small load to a large load, and a pilot burner for igniting gas discharged when the load is large.

4. In a means for testing gas meters, the combination of a casing, flexible means dividing the interior of said casing into two separate chambers, an indicating device operated by said flexible means, a discharge for gas from said chambers adapted to be connected to and disconnected from either chamber, a supply pipe leading from the meter to be tested and adapted to be connected to and disconnected from either chamber, and means for controlling the amount of gas passing through said discharge so as to vary it from a small load to a large load, said discharge having blue flame producing means.

5. In a means for testing gas meters, the combination of a casing, flexible means dividing the interior of said casing into two separate chambers, an indicating device operated by said flexible means, a discharge for gas from said chambers adapted to be connected to and disconnected from either chamber, a supply pipe leading from the meter to be tested and adapted to be connected to and disconnected from either chamber, and means for controlling the amount of gas passing through said discharge so as to vary it from a small load to a large load, said discharge having a plurality of discharge ports of different sizes and means for cutting off the larger size.

6. In a means for testing gas meters, the combination of a casing, flexible means dividing the interior of said casing into two separate chambers, an indicating device operated by said flexible means, a discharge for gas from said chambers adapted to be connected to and disconnected from either chamber, a supply pipe leading from the meter to be tested and adapted to be connected to and disconnected from either chamber, and means for controlling the amount of gas passing through said discharge so as to vary it from a small load to a large load, said discharge having a plurality of discharge ports of different sizes and means for cutting off all of said ports.

7. In a means for testing gas meters, the combination of a casing, flexible means dividing the interior of said casing into two separate chambers, an indicating device operated by said flexible means, a discharge for gas from said chambers adapted to be connected to and disconnected from either chamber, a supply pipe leading from the meter to be tested and adapted to be connected to and disconnected from either chamber, and means for controlling the amount of gas passing through said discharge so as to vary it from a small load to a large load, said discharge having a plurality of discharge ports of different sizes and means for cutting off all of said ports, one of said discharge ports having a small illuminating flame-producing burner and the other a large blue-flame-producing burner.

8. In a means for testing gas meters, the combination of a casing, flexible means dividing the interior of said casing into two separate chambers, indicating means actuated by said flexible means, an inlet and an outlet port opening into each chamber, connections between the inlet ports and the discharge of the meter to be tested, a gas consuming device, connections between said outlet ports and said consuming device, manual means for closing said inlet ports and said outlet ports, and means for varying the amount of gas discharged through said consuming device during the test from a small load to a large load, said chambers being located between said last named means and the meter to be tested.

9. In a means for testing gas meters the combination of a casing, flexible means dividing the interior of said casing into two separate chambers, indicating means actuated by said flexible means, an inlet and outlet port opening into each chamber, connections between the inlet ports and the discharge of the meter to be tested, a gas consuming device, connections between said outlet ports and said consuming device, means for closing said inlet ports and said outlet ports and means for varying the amount of gas discharged through said consuming device from a small load to a large load, and means for passing gas through said meter independently of said chambers.

10. In a means for testing gas meters, the combination of a casing, flexible means dividing the interior of said casing into two separate chambers, indicating means actuated by said flexible means, an inlet and an outlet port opening into each chamber, connections between the inlet ports and the discharge of the meter to be tested, a gas consuming device, connections between said outlet ports and said consuming device, said consuming device having a plurality of burners of different sizes and means for independently cutting off the larger burner.

11. In a means for testing gas meters, the combination of a casing, flexible means dividing the interior of said casing into two separate chambers, indicating means actuated by said flexible means, an inlet and an outlet port opening into each chamber, connections between the inlet ports and the discharge of the meter to be tested, a gas consuming device, connections between said outlet ports and said consuming device, means for closing said inlet ports and said outlet ports, said consuming device having a plurality of burners of different sizes and means for independently cutting off the larger burner, and a by-pass around said chambers discharging through the larger burner.

12. In a means for testing gas meters, the combination of a casing, flexible means dividing the interior of said casing into two separate chambers, an indicating device operated by said flexible means, a discharge for gas from said chambers adapted to be connected to and disconnected from either chamber, a supply pipe leading from the meter to be tested and adapted to be connected to and disconnected from either chamber, and means for controlling the amount of gas passing through said discharge so as to vary it from a small load to a large load, said indicator consisting of a flag wire and a flag connecting said flag wire and flexible means, and an arm connected directly to said flag wire and having a to and fro movement and a scale in juxta-position to the end of said arm.

RICHARD L. DEZENDORF.

Copies of this patent may be obtained for five cents each, by addressing the "Commissioner of Patents, Washington, D. C."